Patented July 7, 1936

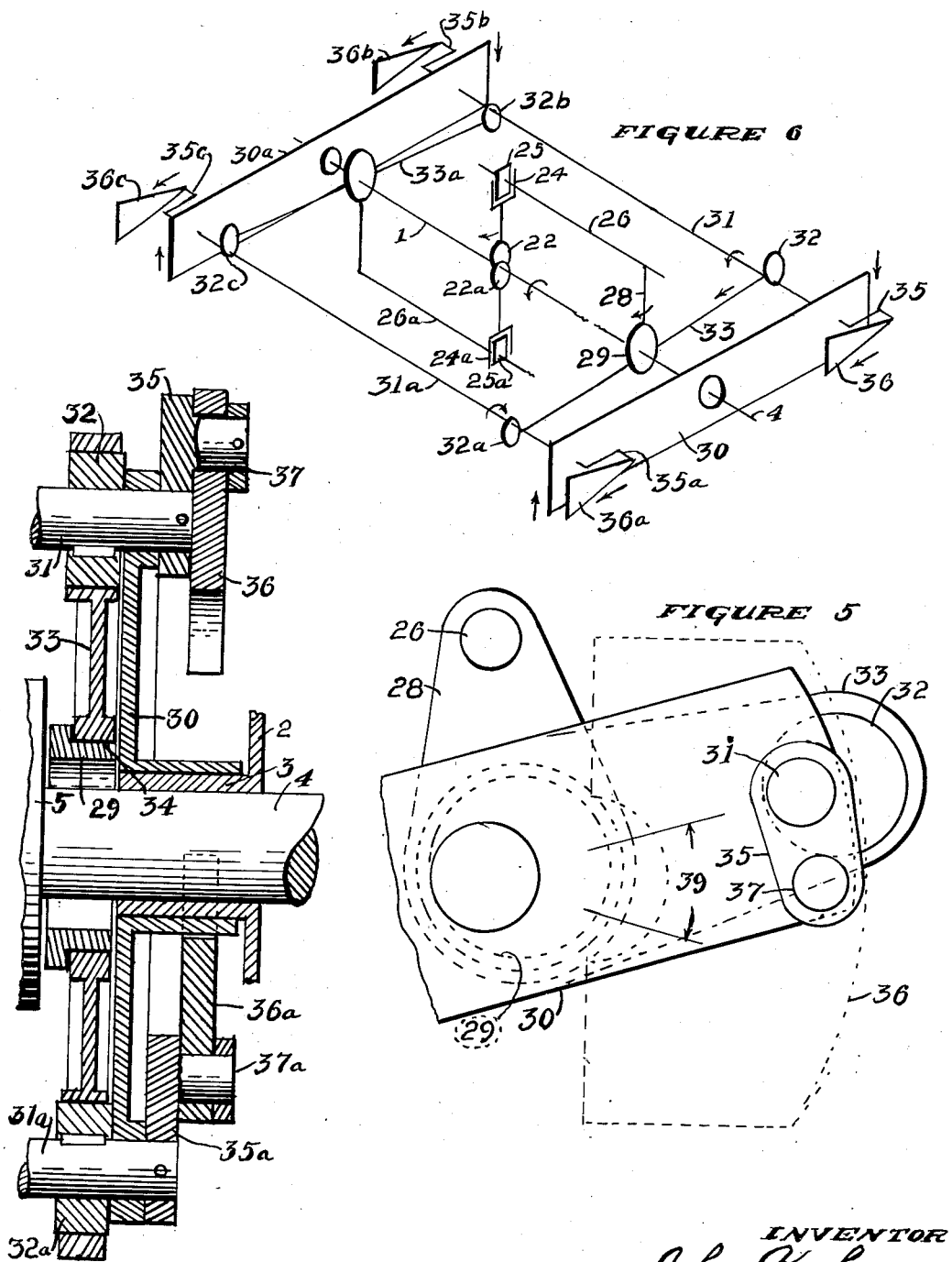

2,046,877

UNITED STATES PATENT OFFICE 2,046,877

AUTOMATIC POWER TRANSMISSION

John Krohn, San Martin, Calif.

Application February 28, 1934, Serial No. 713,320

6 Claims. (Cl. 74—259)

The principal object of this invention is to provide a power transmitting mechanism which automatically transmits or multiplies drive shaft forces in accordance with the load on the driven shaft. Other important objects in order to make such a mechanism commercially successful are simple, durable and practical construction, compact dimensions, and proper performance.

In the drawings:

Figure 4 is a section on line 4—4 of Figure 3.

Figure 5 is an elevation of a portion of the device showing the method of operation of one of the connections to the reaction weights.

Figure 6 is a diagram illustrating the mode of operation of the device.

Figure 1:
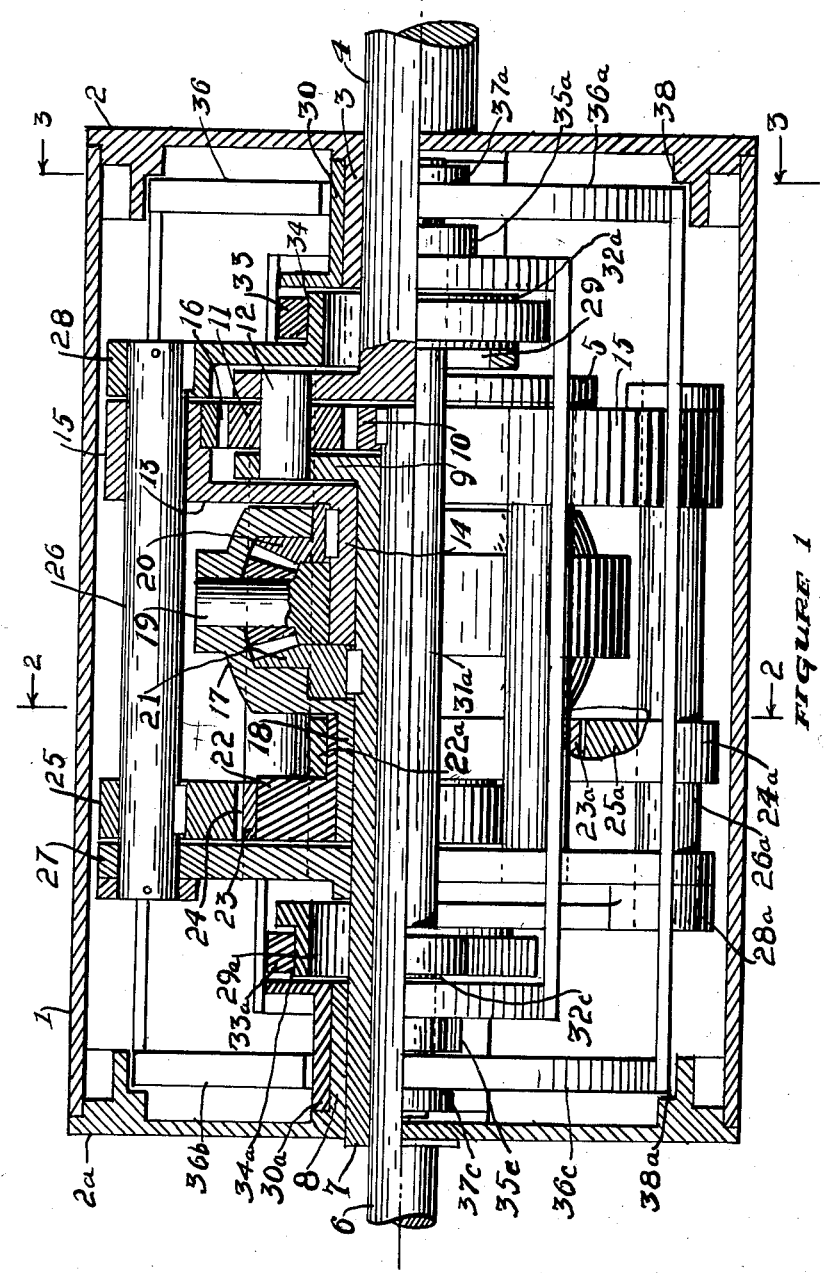
Figure 1 is a longitudinal section through a device embodying my invention, partly in elevation, and with parts broken away.
Figure 2:
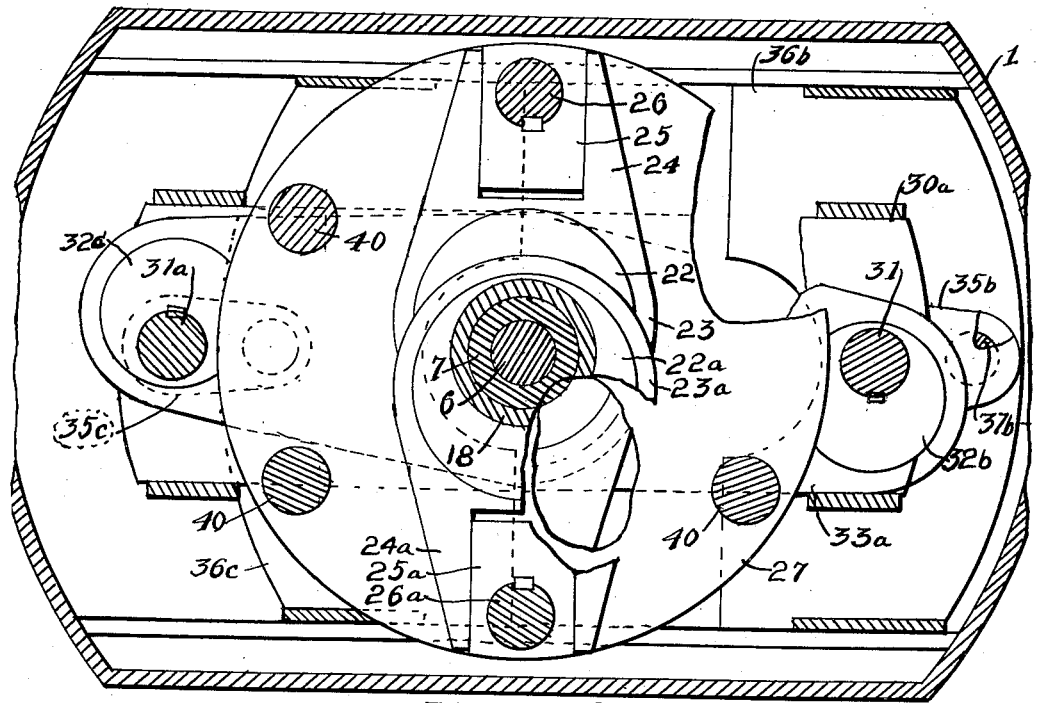
Figure 2 is a section on line 2—2 of Figure 1, with parts broken away.
Figure 3:
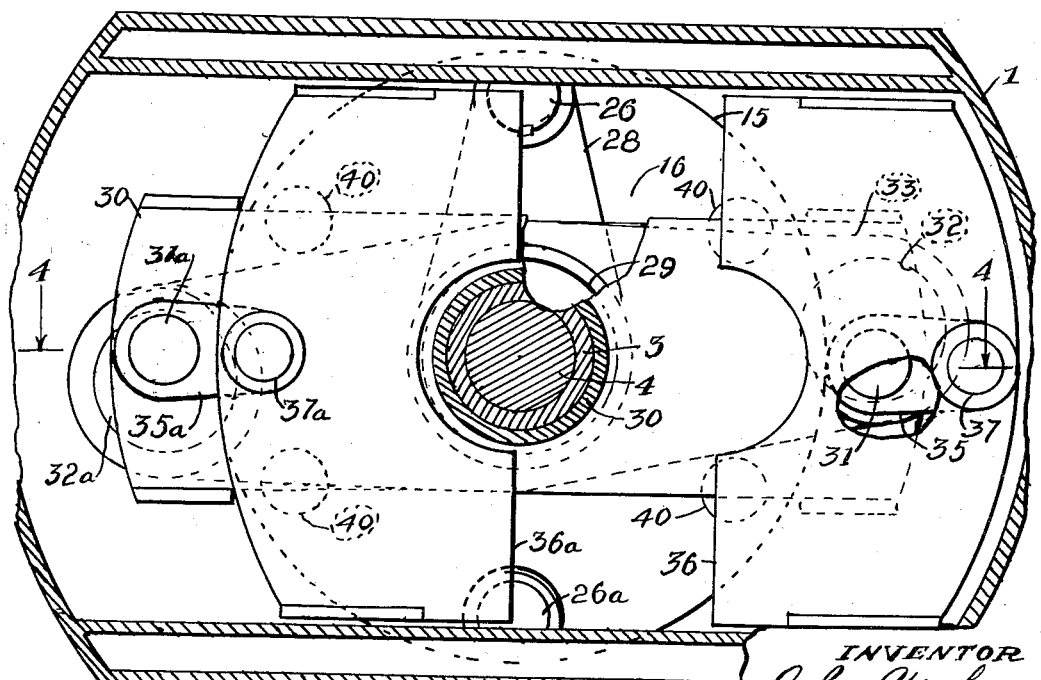
Figure 3 is a section on line 3—3 of Figure 1, with parts broken away.

The transmission herein disclosed is of the inertia type, based essentially upon the laws governing the effects of mass motion, and is controlled by torque reactions of the driven shaft. Torque differences between drive and driven shafts may vary continuously from zero to a reasonably great volume without a fixed limit. Its range depends on many factors which must be considered together in the design with a desirable torque range in view.

The masses inter-connected with the mechanism perform two distinct and separate functions, one based on their resistance to motion, or static inertia, and the other on the effect of their motion at different speeds, or dynamic inertia. The former makes possible the transmission of equal torque beween drive and driven shafts, and the latter the multiplication of torque between them, and these two factors are broadly the essence of this invention.

Referring now more particularly to the drawings, I show at 1 a fixed housing fitted with ends 2—2a. The end 2 is provided with an inwardly extending bearing member 3 in which is journaled the driven shaft 4. The driven shaft 4 terminates in an end plate 5.

At 6 is shown the drive shaft which is journaled in a sleeve 7, the said sleeve being in turn journaled in bearing 8 in end 2a and having a plate 9 disposed in opposed relation to plate 5. Shaft 6 has a pinion 10 mounted thereon meshing with planetary gears as 11 on pins as 12 set in the opposing plates 5 and 9 and thereby tying sleeve 7 and shaft 4 into one unitary structure.

The annular member 13, hereinafter called the reaction member, has a hub portion 14 journaled on the sleeve 7, and a peripheral portion 15 overlying the said planetary gears 11 and provided with an internal gear 16 meshing with said gears 11.

At 17 is shown a differential gear case encompassing the hub 14 and having a sleeve portion 18 journaled on the sleeve 7. Pinions as 19 are mounted in the case as shown, one side gear of the differential, as 20, being keyed to the hub 14 and seated in case 17 to rotate therewith, while the other side as 21 is keyed to the sleeve 7 as shown.

Secured to the sleeve portion 18 is eccentric 22 and an eccentric 22a is secured to an extension from eccentric 22, these eccentrics being set one hundred and eighty degrees apart, each operating in a strap as 23—23a. On the strap 23 is formed a fork 24 which has slidable engagement with a block 25 keyed to a shaft 26 journaled in part 15 and in a plate 27 which is in turn journaled on sleeve 7.

The parts 22a to 26a, inclusive, are identical with the parts 22 to 26 described but are disposed at an angle of one hundred and eighty degrees thereto.

This construction is such that when the two shafts 4 and 6 rotate as a unit and at the same speed, then all of the parts described as being mounted on them rotate with them as one solid mass. But if one shaft rotates faster than the other, then this difference in speed of rotation is reflected in an independent rotary motion of reaction member 13 through the medium of pinions 11, and this independent movement is again reflected through the differential and the eccentrics 22—22a to rock the shafts 26—26a through equal arcs but in opposite directions. Parts 13 and 27 are tied together by rods 40.

Keyed to shaft 26 is an arm 28 terminating in a collar 29 encircling shaft 4 but having a diameter greater than the shaft whereby the arm may swing through a limited arc.

Journaled on the bearing member 3 is a crossarm 30, this cross-arm and the corresponding parallel arm 30a at the opposite end of the device having shafts 31—31a journaled therein and symmetrically disposed on opposite sides of the axis of the device, and normally lying in a plane at right angles to the arms 28—28a.

On shaft 31 is mounted eccentric 32 and on shaft 31a is mounted an eccentric 32a at an angle of one hundred and eighty degrees to eccentric 32. A pitman 33 is journaled on collar 29 of arm 28 as at 34 and extends diagonally across the plane of shafts 31—31a to engage the eccentrics 32—32a. On the adjacent end of shaft 31 is a crank 35 having pivotal engagement with a weight 36 as at 37, the weight being slidably mounted in ways 38 in end 2 and having a radial reciprocating movement with respect to the axis of shaft 4.

On the corresponding end of shaft 31a is a crank 35a having pivotal connection with a weight 36a as at 37a, the weight being slidably mounted in ways 38a in end 2, and the crank being positioned similarly to crank 35.

At the opposite end of the device the structure and operation are similar to that above described, but since the pitman 33a moves in the opposite direction to 33 it follows that eccentrics 32b and 32c are reversed as to eccentrics 32 and 32a thereby moving weights 36b—36c simultaneously with, and in the same direction as, weights 36—36a. Cranks 35b—35c parallel cranks 35—35a respectively.

It is to be understood that the parts 1, 2, and 2a (with their ways 38—38a) and bearings 3 and 8, provide a nonrotating supporting structure, while the parts 4 to 7 and 9 to 29 inclusive may rotate as a unit in said structure. The weights 36—36a do not rotate but are mounted to reciprocate radially in ways 38, and the parts 30 to 35 inclusive have an oscillating movement only.

Obviously, when shafts 4 and 6 rotate at the same speed no swinging movement is set up in arm 28 and the collar 29 is held in axial alignment with the shafts, rotating freely in pitman 33 and imparting no movement thereto, and the weights remaining stationary. But when the shafts 4 and 6 are rotated at different angular velocities a swinging movement is developed in arm 28 through the medium of parts 9 to 26 inclusive, and the swinging collar 29 sets the weights in motion through the medium of the oscillating mechanism described.

It has already been made clear that whenever there is any difference in speed between the drive and driven shafts a rocking motion is imparted to shafts 26—26a, and it may now be seen that when this occurs the pitmans 33 and 33a set up a rocking and weaving movement, in opposite directions, while the cross-bars, 30—30a rock on their bearings, the weights 36 to 36c sliding in their ways. This, of course, is occurring at the same time that the rotor as a whole is turning on its axis.

The collar 29 must be held in axial alignment with the shafts when they are rotated at the same speed because the collar is a part of the rotating mass 4—7 and 9—29 and consequently rotates on said axis, and it is held in that position when the shafts attain a one-to-one ratio by the resistance offered by the weights.

Just as soon as the shafts 4 and 6 begin to rotate at different angular velocities and the arm 28 and collar 29 begin to swing the resistance of the weights is overcome and they begin to reciprocate, reciprocating faster and faster until the resistance to acceleration balances the driven shaft torque and the two shafts begin to rotate at the same speed.

The result of this construction and mode of operation is, that the weighted members 36—36c are constantly opposing movement of arms 28—28a relative to the axis of rotation of the rotor and therefore constantly endeavoring to establish a fixed driving connection between the drive and driven shafts, because obviously they can only rotate as a unit when the collar 29 of arm 28 is coaxially disposed relative thereto, and no differential action can take place.

When drive shaft torque is equal to driven shaft torque, all members of the rotor assembly remain in substantially the same relative position without pronounced motion, and the rotor revolves as a locked unit, the collars 29—29a being in a central position as above described. These arms 28—28a, however, are operatively linked to weights 36—36c, and these, therefore, must be set in motion for arms 28—28a to be able to swing off the center. This, of course, occurs readily when there is any difference in torque between drive and driven shafts, but readily only when this torque difference comes on gradually, say at a low rate.

Any sudden increase in torque difference or any series of high frequency torque pulsations may not induce any pronounced weight motion for the reason that these pulsations are out of phase or step with the natural reciprocation periods of the weight masses. The weights resemble pendulums in that they are capable of reciprocating in variable amplitudes of motion but with a fixed natural period of reciprocation unless this period of reciprocation is changed by other forces. Consequently the weight will move and accelerate, decelerate and stop, easily and readily, if the force is applied at its natural reciprocation periods.

When the torque difference between shafts is such that arms 28 swing at their natural rate of reciprocation of the weights, no force is required to maintain that motion, except to overcome friction, and there is no inertia effect. There is only an inertia effect where the natural reciprocation periods are changed by force, this force coming from a drive shaft at high angular speed and being converted by the mass motion into tortional forces at lower angular speed.

When torques are equal (high speed driving) the rotor turns as a whole, acting substantially as a solid coupling between shafts. Arms 28—28a are in central position turning in pitmans 33—33a, and at high speed of rotation the weights would have to reciprocate at that rate also, to which they offer great resistance, and again if the weights do not move no difference in speed between shafts can take place. In this condition static mass inertia only is utilized.

When starting slowly with heavy torque load on the driven shaft differential motion takes place, the weights through their connections with the arms 28—28a move at maximum amplitude but at low rate of speed, this rate of speed being determined by the planetary gear ratio and the differential. The case of the differential turns at a speed of half the difference between the speed of driven shaft 4 and the speed of the reaction member 13 by virtue of being connected by its gearing to the two members. The speed of the case being, therefore, proportional to the difference in speed of members 4 and 13 at all times, so must be that of the masses, and that is the function of the differential, and it is important that this be so because the torque in these two members cannot be unequal, one reacting upon the other, and therefore any torque change in driven shaft 4 must at the same time meet an equal torque resistance in member 13, and through the differential action this is timed correctly and supplied by the motion of the weight masses. On account of arms 28—28a swinging across the center at the moment, or at any time, when in that position drive shaft torque only can be transmitted, and the motion of the weight is zero. Also and accordingly, there can be no torque difference between drive and driven shafts unless the weights are in motion.

When the rotor is running solid, corresponding to high gear performance in an automobile, there is substantially no difference in torque between drive and driven shafts. Reactive forces are equal to those of the engine and are mainly taken by its supporting structure.

There is, however, a tendency for differentiating in the rotor assembly, showing itself in an endeavor of swinging arms 28—28a and their linkage with the masses, to set these in motion which, however, cannot take place to any extent except in the nature of high frequency reciprocations of small amplitude as previously explained. As the load increases in driving up a long grade it is reflected in decreasing engine speed, which in turn lowers the frequency of the mass reciprocations, making possible a greater amplitude with a sort of see-sawing motion, or rocking forth and back at a low rate of frequency. The frequency of this motion is the result of differential motion in the rotor mechanism due to torque differences and takes place gradually and slowly and more in harmony with the natural reciprocation period of the masses. Two sets of forces as it were are present, static and dynamic, superimposed upon one another, one gaining, the other losing, which as said at first shows itself in a slow back and forth motion, increasing its amplitude and decreasing frequency with increasing load until the full amplitude as determined by the throw of the cranks is utilized.

Theoretically, the frequency of reciprocation of the masses in their connections can be increased indefinitely or even infinitely, but practically limiting and balancing influence is present in the fact that with a substantial increase in driven shaft torque, a torque increase in the drive shaft occurs also, due to the fact that with an increase of frequency in mass motion their torque resistance increases at the rate of the square of their speed, which in turn is again reflected in the mechanism.

The diagram is inserted to show the four masses 36 to 36c and their connections whereby they react simultaneously to changes in the angular velocity of shaft 6.

Selecting the one mass 36 and its connections for the purpose of illustration, let it be assumed that the shaft 6 is turning slowly as when the engine is idling, the shaft 4 with pin 12 and sleeve 7 being without motion. The pinion 11 now functions merely as an idler rotating on its own axis but nonrotational with respect to the axis of shaft 4, the driving force of shaft 6 actuating the pinion and through it rotating the reaction member 12 and the differential part 17 with its sleeve portion 18. Since the sleeve portion 18 is rotated continuously in the direction indicated by the arrow a swinging movement is imparted to arm 28 and collar 29 through the medium of the parts 22 to 26 inclusive. Since the pitman 33 is journaled on collar 29 it swings therewith and by means of its eccentric connection to shaft 31 at 32 it imparts a rocking motion to said shaft and to the crank 35 on the end thereof. Since the crank is pivotally connected to the weight 36 at 37 and the said weight 36 can only reciprocate in a straight line radially disposed relative to the axis of shaft 6, it follows that the forced rocking of shaft 31 will operate the crank 35 to actuate the weight 36, at the same time rocking the cross-arm 30 to permit lineal movement of the weight as described.

Under the conditions above set forth the parts 1—4, 12, 9, 7, 21 are stationary, the weights 36—36c reciprocate radially in their ways, and the parts 13 to 20, 22 to 26, 28 and 29 rotate about the axes of shafts 6 and 4.

It is obvious, then, that if the torsional force applied to shaft 6 is increased this additional force must be evidenced either by increased angular velocity of the shaft 6 and increased rapidity of movement of the parts already being driven thereby, or by forced rotation of shaft 4. Since the inertia of the masses as 36 operates to retard acceleration of movement of the rotating parts its follows that the acceleration of gear 10 is not accompanied by a corresponding acceleration of gear 16 on reaction member 13, consequently the pinions 11 are caused to roll in the gear 16 and the sleeve 7 and shaft 4 are put into motion.

When the driven shaft becomes the driver as in coasting, a corresponding speed increase and torque decrease is obtained.

The power transmitting mechanism above described is primarily intended for automobiles, and its characteristics have therefore been determined with that object in view. Numerous applications to other uses suggest themselves, or may be developed where the mechanism of this kind promises to be advantageous. On account of the great variety of transmission requirements called for in an automobile, reference to performance applies to that service.

The term "automatic" as used herein means that difference in speed and torque between drive and driven shafts are obtained without manual manipulation of gear sets or gear shifting devices. The engine's throttle provides the only means of manual control of the speed of the car.

The maximum movement of the rocker cross-arm 30 is indicated at 39 in Figure 5.

I claim:

1. In a power transmission means, an assembly mounted upon a common axis of rotation, and comprising a driving member, a driven member, a reaction member revolubly associated with said driving member, differential gearing connecting said driven member and said reaction member, and a non-rotatable reaction mass, a supporting frame for said mass, and operating connections between said mass and said rotatable assembly.

2. A power transmission mechanism comprising, in combination, a driving and a driven shaft and a reaction member, a planetary gearing connecting said shafts and said member, reaction masses mounted for reciprocating radial movement with respect to the axis of said shafts, and reaction member actuated means for moving said masses, said means including a differential gearing inserted between the reaction member and the driven shaft.

3. In a power transmission, a drive shaft carrying a sun gear, a driven shaft carrying an intermediate planetary gear associated with said sun gear and also a differential side gear, a reaction member carrying an internal gear associated with the intermediate planetary gear and also carrying a differential side gear, a differential spider carrying a differential intermediate gear associated with the said side gears and also carrying swinging arms drivingly connected with said differential intermediate gear, stationarily supported radially reciprocating reaction masses drivingly connected with said swinging arms.

4. In combination, a driving shaft, a driven shaft, a revoluble reaction member associated therewith, planetary gearing drivingly connecting said shafts and connected to said member to rotate the same as a unit therewith when rotating at the same angular velocity and relative thereto when rotating at different angular velocities, a reaction member actuated differential gearing, nonrotating supporting means, a reaction mass slidably associated with said supporting means and mounted for radial reciprocation with respect to the axis of said shafts, and means connecting the differential gearing and mass to reciprocate the mass when the reaction member is rotated relative to the shafts.

5. In combination, a driving shaft, a driven shaft, a revoluble reaction member associated therewith, planetary gearing drivingly connecting said shafts and connected to said member to rotate the same as a unit therewith when rotating at the same angular velocity and relative thereto when rotating at different angular velocities, an arm swingably associated with the reaction member and disposed to swing across the axis of said shafts, reaction member actuated means connected to said arm to swing the same when said reaction member is rotated relative to the shafts, nonrotating supporting means, a reaction mass slidably associated with said supporting means and mounted for radial reciprocation with respect to the axis of the shafts, and arm actuated means for reciprocating the mass.

6. In combination, a driving shaft, a driven shaft, a revoluble reaction member associated therewith, planetary gearing drivingly connecting said shafts and connected to said member to rotate the same as a unit therewith when rotating at the same angular velocity and relative thereto when rotating at different angular velocities, a reaction member actuated differential gearing, an arm swingably associated with the reaction member and disposed to swing across the axis of said shafts, differential gearing actuated means connected to said arm to swing the same when said reaction member is rotated relative to the shafts, nonrotating supporting means, a reaction mass slidably associated with said supporting means and mounted for radial reciprocation with respect to the axis of the shafts, and arm actuated means for reciprocating the mass.

JOHN KROHN.